United States Patent [19]

Cox et al.

[11] Patent Number: 4,653,553
[45] Date of Patent: Mar. 31, 1987

[54] AGRICULTURAL BAG LOADING MACHINE

[75] Inventors: Larry B. Cox, Fawn Grove, Pa.;
William C. Johnson, Omaha, Nebr.;
Roland W. Marpoe, Aberdeen, Md.

[73] Assignees: Poly Farms, Inc., Dallas, Tex.; a part interest; Rand Farms Systems, Inc., Havre De Grace, Md.; a part interest

[21] Appl. No.: 912,157

[22] Filed: Sep. 24, 1986

Related U.S. Application Data

[63] Continuation of Ser. No. 767,073, Aug. 19, 1985, abandoned, which is a continuation of Ser. No. 594,323, Mar. 28, 1984, abandoned.

[51] Int. Cl.⁴ .......................... D65B 1/10; B65G 3/04; A01F 25/16
[52] U.S. Cl. ..................... 141/114; 141/10; 141/12; 141/71; 141/98; 141/231; 141/251; 141/314; 141/316; 100/65; 100/191; 56/344
[58] Field of Search ................ 56/341, 344; 141/10, 141/12, 114, 71, 81, 98, 231, 250, 251, 256, 255, 286, 259, 262, 313–317; 100/211, 65, 191, 192

[56] References Cited

U.S. PATENT DOCUMENTS

| | | | |
|---|---|---|---|
| 2,672,807 | 3/1954 | McClelland et al. | 100/191 |
| 3,090,182 | 5/1963 | Johnson et al. | 100/191 |
| 3,478,909 | 11/1969 | Charles | 100/211 X |
| 3,687,061 | 8/1972 | Eggenmuller et al. | 100/65 |
| 3,760,556 | 9/1973 | Morris | 141/71 X |
| 4,037,528 | 7/1977 | White et al. | 100/91 |
| 4,046,068 | 9/1977 | Eggenmuller et al. | 100/65 |
| 4,125,071 | 11/1978 | Young | 100/91 |
| 4,162,603 | 7/1979 | Stromberg | 141/12 X |
| 4,185,446 | 1/1980 | Clostermeyer et al. | 56/344 |
| 4,236,444 | 12/1980 | Seffrood | 100/65 |
| 4,273,034 | 6/1981 | Molitorisz | 100/191 |
| 4,310,036 | 1/1982 | Rasmussen et al. | 141/114 |
| 4,337,805 | 7/1982 | Johnson et al. | 141/71 |
| 4,424,051 | 1/1984 | Lee et al. | 494/37 |
| 4,489,648 | 12/1984 | Naaktegeboren | 100/191 |

FOREIGN PATENT DOCUMENTS 2447788 10/1980 France .............................. 100/211

Primary Examiner—James E. Bryant, III
Assistant Examiner—Ernest G. Cusick
Attorney, Agent, or Firm—William R. Laney

[57] ABSTRACT

An agricultural bag loading machine having an improved mechanical assembly for automatically effecting controlled, continuous compression and delivery of compacted animal feed material into a flexible agricultural storage bag via a compression and delivery chamber. The compressed, delivered feed material has a uniform, air tight side wall density throughout the bag-delivered, sausage shaped feed material mass. The loading machine has additional features, including a pneumatic bladder assembly for changing the forming chamber dimensions and configuration, an improved agricultural bag attachment and continuous feeding mechanism which eliminates bag fold-over and wrinkling problems during filling, and an integral forming chamber cleanout mechanism which enables clearing and cleaning of the forming chamber at the end of an agricultural bag loading operation.

10 Claims, 21 Drawing Figures

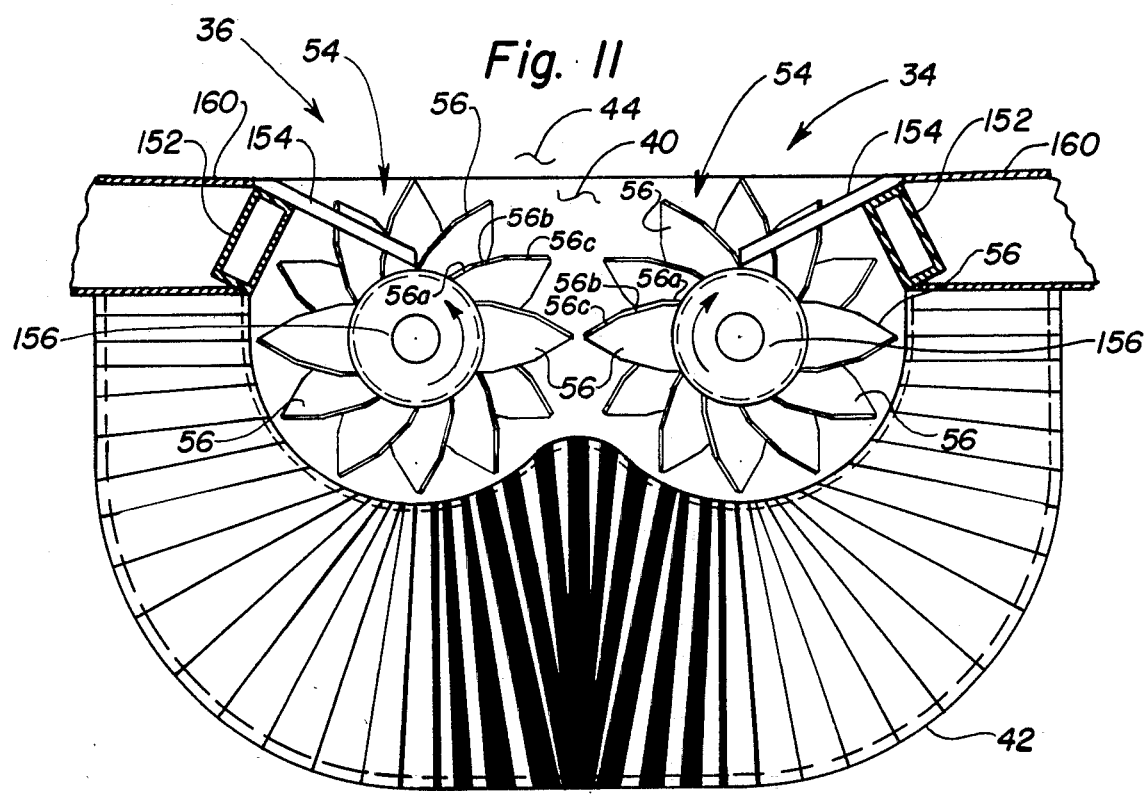
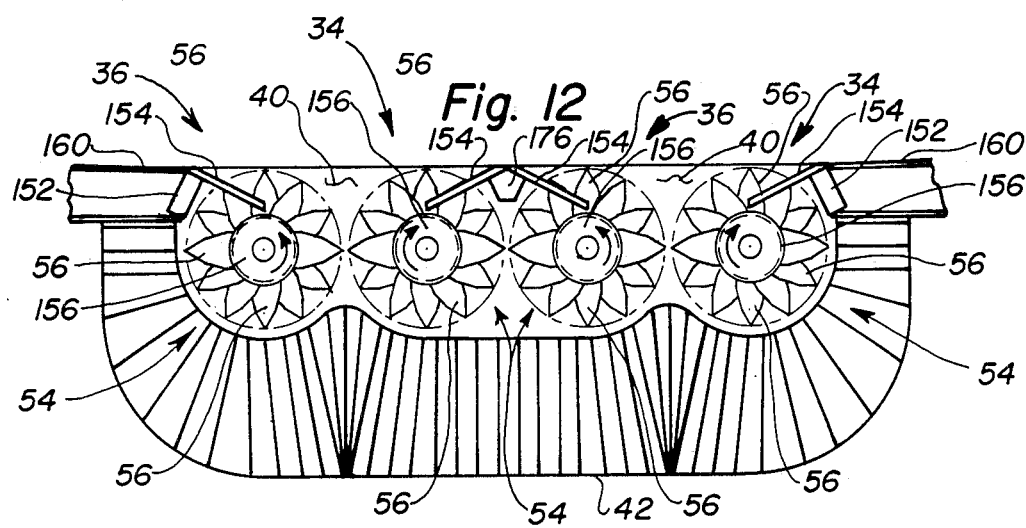
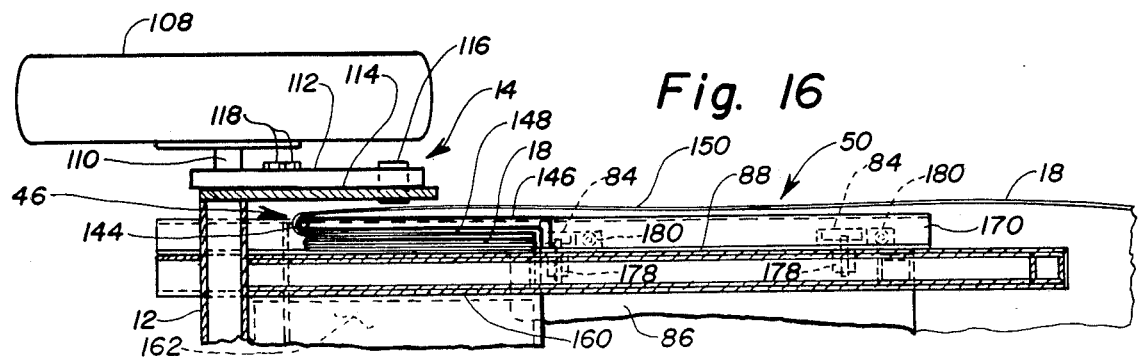

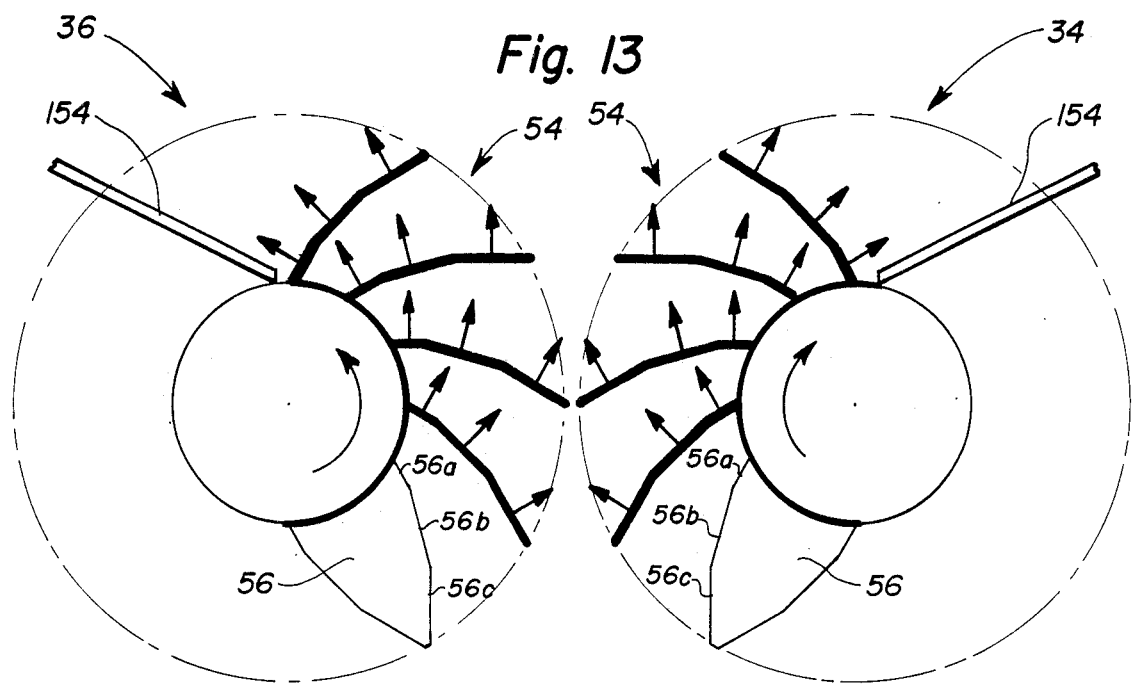
Fig. 13
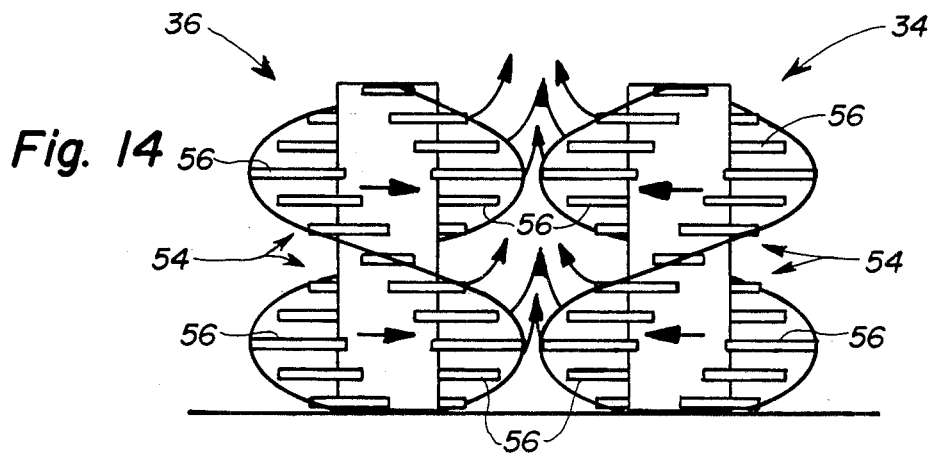
Fig. 14
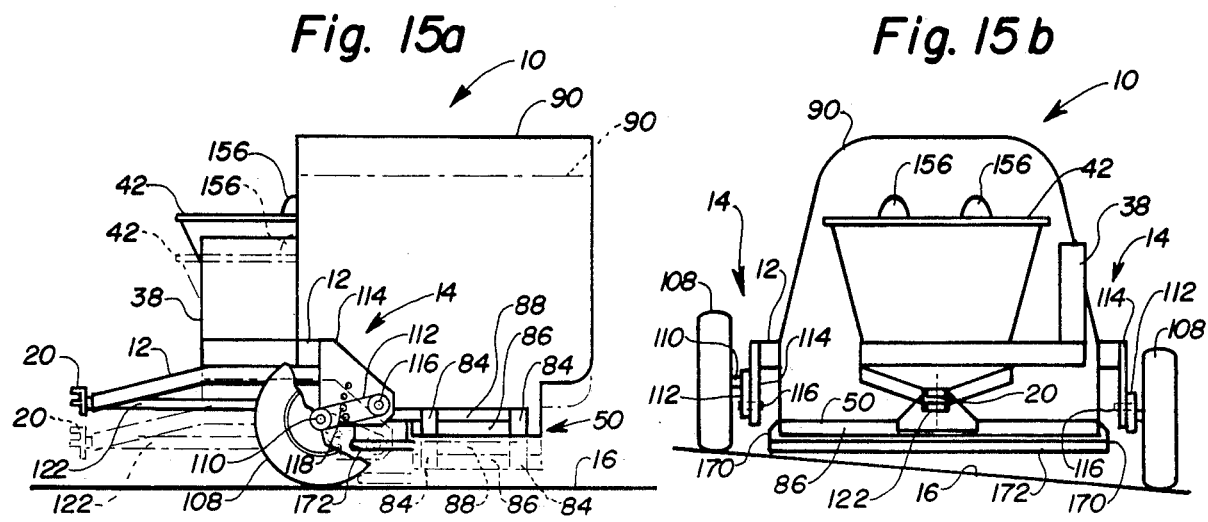
Fig. 15a
Fig. 15b

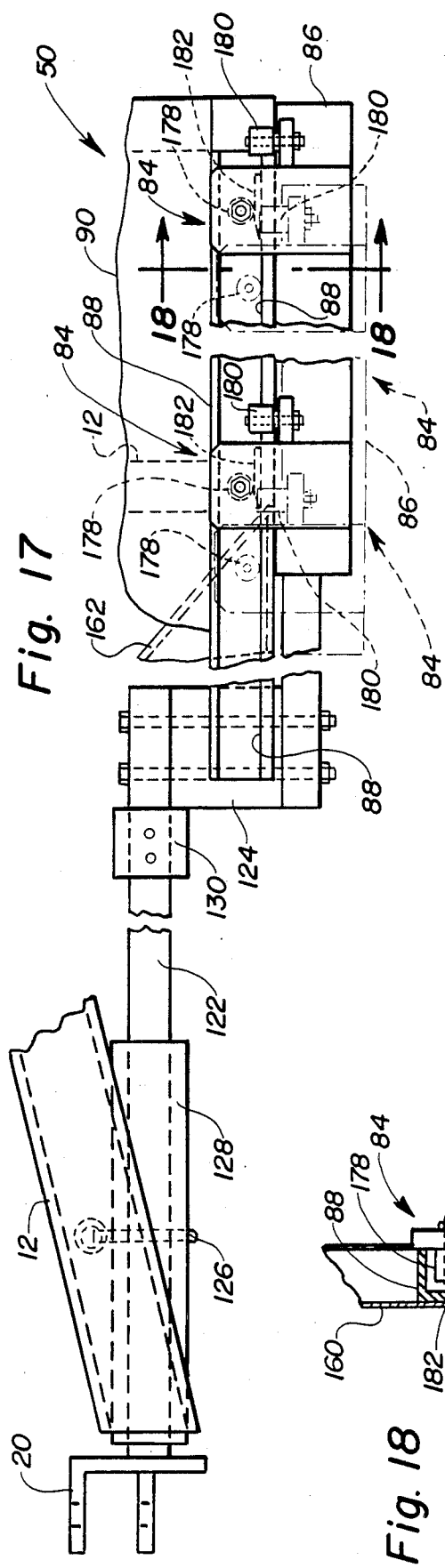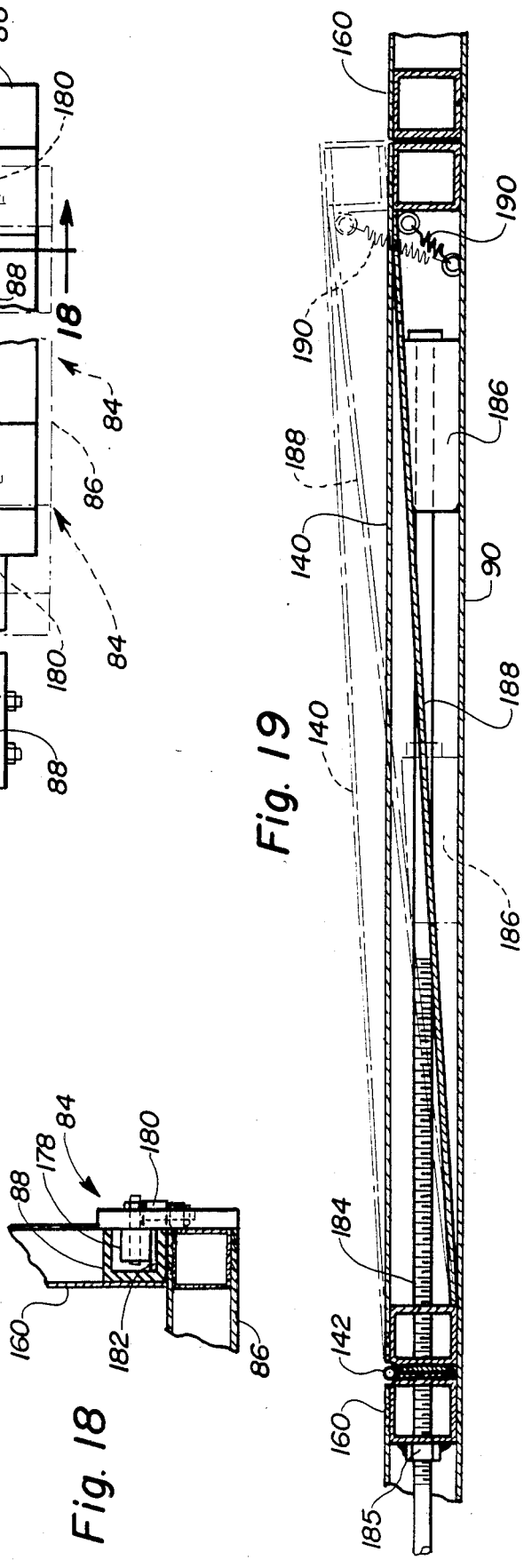

AGRICULTURAL BAG LOADING MACHINE

This is a continuation of co-pending application Ser. No. 767,073 filed on Aug. 19, 1985, now abandoned, which is a continuation of Ser. No. 594,323, filed Mar. 28, 1984, now abandoned.

FIELD OF THE INVENTION

This invention relates to a machine for continuously loading a flexible agricultural bag with uniformally compacted feed material. More particularly, this invention relates to a machine which uses a pair of side-by-side counterrotating tine shaft assemblies which force livestock feed material into a compression and forming chamber, and from thence, via a delivery chamber, into a flexible agricultural bag as the bag is paid out from the machine at a controlled rate.

BACKGROUND OF THE INVENTION

The instant invention relates to an agricultural bag loading machine which provides an improved mechanical capability for automated continuous compression and progressive formation delivery of animal feed material into a compacted uniformly airtight sausage-shaped mass within an agricultural storage bag of that general type as taught in U.S. Pat. No. 4,424,051 dated Jan. 3, 1984, to Lee et al, for accomplishing with ease and efficiency the so-called horizontal silo configuration of temporary in-field animal feed material storage.

The evolution of modern automated material handling equipment in accomplishing the horizontal silo storage method of temporary in-field animal feed material storage starts generally with the first generation teaching of Eggenmuller et al as set forth in U.S. Pat. No. 3,687,061 dated Aug. 29, 1972, which discloses a temporary horizontal silage storage mass forming and compression machine, one embodiment of which is mounted upon a wheeled carriage structure wherein loose silage material is received from a gathering and transport towing vehicle and conveyably directed therefrom through a forming channel by means of cooperative upwardly inclined oppositely directed pairs of screw conveyor assemblies to thereby elevate and compactedly form the loose silage material progressively into a compressed mat the density of which is variably controlled and determined by the screw forcing conveyancing pressure imparted to the loose silage material in movement thereof through the forming channel, and further varied by means of a carriage mounted adjustable cable type brake drum restraint mechanism connected by cable therefrom to a stationary backstop boundary wall such as to afford resistance between the backstop wall and movement of the machine wheeled carriage and thereby effect additional compression of the progressive silage material mat buildup, all of which is contained within a pliable protective covering material such as plastic or the like.

The second generation automated material handling equipment development for improved accomplishing of the horizontal silo storage method of temporary in-field animal feed material storage in conjunction with currently available agricultural bags was also by Eggenmuller et al in U.S. Pat. No. 4,046,068 dated Sept. 6, 1977, wherein the machine improvements are characterized first by a greater mobility capability for facilitated use employment displacement to various in-field locations, and second by the embodiment of a single pressing roll shaft extending almost across the full horizontal width of the forming channel wherein the roller shaft is provided with a plurality of rigidly affixed teeth or tines arranged in a longitudinally displaced helical array circumferentially about the horizontal length thereof. Another second generation agricultural bag loading machine teaching which is but marginally distinguished from the Eggenmuller U.S. Pat. No. 4,046,068 improvement disclosure is that of Johnson et al as set forth in U.S. Pat. No. 4,337,805 dated July 6, 1982, wherein the horizontal single pressing roll shaft has the rigidly assembled plurality of teeth or tines mounted thereon in a so-called random rather than a regularly repeating pattern.

The third generation mechanized device for use in compactedly depositing animal feed material progressively into an elongated agricultural bag is set forth in that teaching by Seffrood in U.S. Pat. No. 4,236,444 dated Dec. 2, 1980, which embodies a feed material compression means comprised of wheels provided with a plurality of canted angle sectors disposed oblique relative to the axis of wheel rotation respectively which operate upon rotation within the forming chamber to engage, compress, and deliver animal feed material progressively into the typical sausage-shaped continuously formed compacted mass within an agricultural bag as has been previously described.

In all of the foregoing devices, as in the machine of the instant invention, it is necessary, in order to properly employ the horizontal silo method for temporary in-field animal feed material storage such that there is a minimum of shrinkage, spoilage, and loss of nutritional value of the stored product, that the bag loading machine be mechanically capable of consistently forming and compressing various of the animal feed materials which are likely to be handled progressively into a dense airtight continuous sausage-shaped mass of uniform sidewall density which completely fills the agricultural bag interior from side-to-side, top-to-bottom, and end-to-end.

It should be understood that some of the features of the instant invention have, in some respects, structural and functional similarities to certain of the teachings separately set forth in the prior art disclosures heretofore cited and briefly discussed. However, as will hereinafter be pointed out, the instant invention is distinguishable from said earlier inventions in one or more ways in that the present invention has utility features and new and useful advantages, applications, and improvements in the art of the agricultural bag loading machines not heretofore known.

SUMMARY OF THE INVENTION

It is the principal object of the present invention to provide an agricultrual bag loading machine which is mechanically capable of consistently forming, compressing, and delivering into an agricultural bag various animal feed materials such as, but not necessarily limited to, forage and silage, progressively as a dense airtight continuous sausage-shaped mass of uniform sidewall density which completely fills the bag interior during formation and loading from top-to-bottom, side-to-side, and end-to-end.

It is another object of the present invention to provide said machine with an agricultural bag attachment and feeding mechanism which substantially enables continuous bag feeding and extension from the opened mouth attachment position without problems of bag fold-over, wrinkling, or tearing during progressive compacted feed material filling thereof.

It is a further object of the present invention to provide said machine with an integral forming chamber clean out mechanism which facilitates forming chamber clearing and cleaning at the end of a particular agricultural bag loading operation.

Still another object of the present invention is to provide said machine with a forming chamber pneumatic bladder means whereby continuous compression and forming of said feed material prior to and during progressive infeed thereof to an agricultural bag is operationally adjusted and controlled by the bladder means thereby to enable and maintain a uniform sidewall density airtight compacting of delivered product for horizontal silo storage.

It is an additional object of the present invention to provide an agricultural bag loading machine embodying incrementally angled teeth or tines rigidly affixed spirally upon cooperative counterrotating vertical shafts adjacent the forming chamber which coactively engage and compressively urge storage material from the machine infeed hopper sequentially through the forming chamber towards and into the bag center, top, bottom and uniformily towards and along the sidewalls in a progressive high density airtight compacted formation delivery thereof.

It is also an object of the present invention to provide an agricultural bag loading machine embodying enhanced roadability characteristics in accomplishing the use displacement movement thereof from one location to another, and further adapted to be thereafter adjustably conformed in accommodating the particular terrain profile over which said machine will be operationally displaced at the use location in accomplishing bag filling operations.

Details of the foregoing objects and of the invention as well as other objects thereof, are set forth in the following specification and illustrated in the accompanying drawings comprising a part thereof.

BRIEF DESCRIPTION OF THE DRAWINGS

FIG. 11 is an enlarged top plan view of the feed material compression and forming chamber section of the machine of the instant invention showing in greater detail the preferred counterrotating tine shaft assembly embodiment therefor.

FIG. 12 is a top plan view of the feed material compression and forming chamber section of the machine of instant invention showing an alternate counterrotating tine shaft assembly embodiment therefor.

FIG. 13 is a diagrammatic illustration of the incrementally angled pusher tine horizontal counterrotating force profile.

FIG. 14 is a diagrammatic illustration of the cooperative counterrotating tine set vertical force profile.

FIG. 15a is a simplified side elevation view of the machine of instant invention showing therein the relative undercarriage uniform elevation adjustment displacement and set range therefor.

FIG. 15b is a simplified end elevation view of the machine of the instant invention showing therein the relative undercarriage uneven elevation adjustment displacement and set capability therefor.

FIG. 16 is an enlarged top sectional view of the various machine features shown in FIG. 6 as seen along the line 16—16 thereof.

FIG. 17 is an enlarged side elevation view of the retractable floor assembly of the machine of instant invention, foreshortened to accommodate the same to the sheet.

FIG. 18 is an end elevation view of a retractable floor assembly mounting bracket shown in FIG. 17 as seen along the line 18—18 thereof.

FIG. 19 is an enlarged sectional view of an alternate embodiment delivery chamber compression panel adjustment means as would be seen in FIG. 5 along the line 19—19 thereof.

DETAILED DESCRIPTION OF THE INVENTION

Figures 1, 2A, 2B:
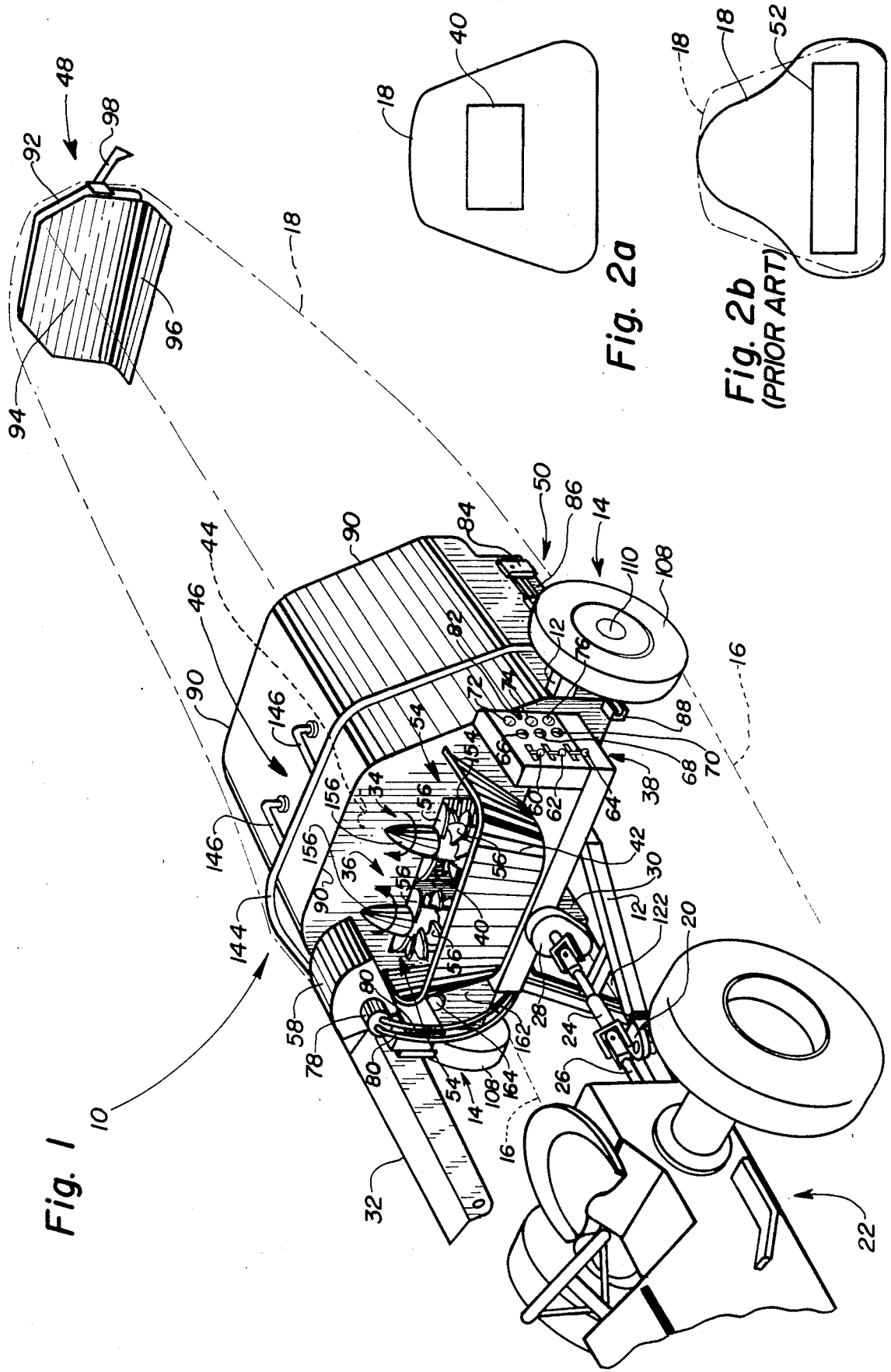
FIG. 1 is a front perspective elevation of the agricultural bag loading machine comprising the instant invention. The machine is shown in a typical use disposition with respect to power take-off attachment thereof to a prime movement vehicle, as well as the typical agricultural bag configuration during filling operations with respect to said machine and the backstop assembly therefor.
FIG. 2a is a simplified diagrammatic crossectional elevation of a filled agricultural bag when loaded with the machine of the instant invention, showing first the machine forming chamber spatial relationship with respect to the bag cross-section, and a second, the bag crossection when feed material is loaded progressively therein with a uniform sidewall density during filling operations.
FIG. 2b is a simplified diagrammatic crossectional elevation of a filled agricultural bag when loaded with prior art machines, showing first the typical prior art machine forming chamber configuration and spatial relationship with respect to the typical bag cross-section when filled thereby and second said typical bag cross-section when feed material is loaded progressively therein without a uniform sidewall density during filling operations.

Referring to FIG. 1, the present invention is shown which comprises an agricultural bag loading machine 10 mounted upon an undercarriage 12 which is provided with a set of separately connected axle and wheel assemblies 14 that enable independent elevation adjustment and set of said undercarriage 12 with respect to the supporting ground surface plane 16 over which said machine 10 is operationally displaced from one use location to another and during use employment thereof in accomplishing progressive feed material compacted formation and directed delivery thereof as an airtight mass of uniform sidewall density into an agricultural bag 8 for in-field on-site storage. In addition, there is provided as shown an undercarriage hitch assembly 20 for towable connection of said machine 10 to a suitable prime movement vehicle 22, such as a tractor or the like. A power take-off connection 24 couples the prime movement vehicle power take-off 26 to the machine 10 speed-up gear box 28. The machine 10 multi-stage hydraulic pump 30 is driven thereby and in turn powers the respective hydraulic drive motors for the infeed conveyor 32 and the counterrotating tine shaft assemblies 34 and 36 through the hydraulic motor control console 38. Additionally shown in FIG. 1 is the feed material compression and forming chamber 40 through which feed material delivered by means of said infeed conveyor 32 to the hopper 42 is compacted and directably urged by said counterrotating tine shaft assemblies 34 and 36 into the delivery chamber 44 for progressive airtight uniform sidewall density directed and delivered deposit thereof to said bag 18 interior, the bag feed control bar assembly 46 which controls bag off-feed and delivery during filling to prevent bag fold-over or wrinkling and tearing, the detachable bag filling backstop assembly 48 against which the bag filling compaction force is directed in order to insure uniform density loading thereof, and the delivery chamber retractable floor assembly 50 which enables facilitated feed material clearing and cleaning of said machine 10 upon completion of a particular bag filling operation, all of which will hereinafter be more fully detailed and described on further consideration of FIG. 1 and the remaining Figures hereof.

In use application for accomplishing agricultural bag 18 filling operations, as has been previously pointed out, it is the function of said machine 10 to consistently form and compressively deliver an animal feed material progressively as a dense airtight sausage-shaped mass of uniform sidewall density. The mass completely fills the bag interior during formation and loading thereof from top-to-bottom, side-to-side, and end-to-end, which is the bag 18 configuration as rendered in FIG. 1 in phantom in order to more clearly enable illustration therein of said machine 10 and the detachable bag filling backstop assembly 48 therefore, the corresponding crosssectional profile of which bag configuration is illustrated in FIG. 2a and in phantom in FIG. 2b. It will be noted, particularly with reference to FIG. 2b, that prior art machines having elongated feed material compression and forming chamber configurations 52 with but a single unidirectional rotating tine shaft assembly positioned to deliver compacted feed material toward the bottom of an agricultural bag 18 tend not to progessively fill the bag 18 with a uniform sidewall density of compacted material. Rather, they fill the bag a manner as to cause distorted bag loading, resulting in excessive outward force on the lower bag sidewalls as shown, and in turn frequently resulting in rupture of the lower bag sidewalls with a consequent deterioration and loss of the feed material stored therein. In contrast, as illustrated generally in FIG. 1, and FIG. 2b in phantom, but particularly in FIG. 2a, a properly filled agricultural bag 18 is provided with compacted storage material that is delivered into the bag by controllable direction and compaction to form sidewalls of uniform density which are self-supporting from top-to-bottom and end-to-end. It has been found that a significant contributing factor to accomplishing proper agricultural bag filling—that is, being filled with a mass of uniform sidewall density—is to re-configure the feed material compression and forming chamber 40 to a less elongated rectangular shape than is typical of all known prior art machinery for accomplishing agricultural bag filling operations. Another factor is to reposition said chamber 40 to a more central lateral and vertical location with respect to the crosssectional center of the agricultural bag to be filled, and to urge the compressed feed material through the chamber 40 opening from input to output with co-operative counterrotating tine sets 54 of incrementally angled pusher tines 56 arranged adjacent said chamber 40 opening as shown generally in FIG. 1 but more specifically in FIG. 3 and certain other Figures hereinafter. Another control variable in creating formed sidewalls of uniform density is the amount of compaction force exerted upon the material delivered progressively to the bag 18. This compaction force is a function of the braking force applied to resisting machine 10 and prime movement vehicle 22 displacement away from the sausage-shaped mass build-up end as it is progressively formed within the bag 18 between the backstop assembly 48 and the delivery chamber 44, a subject of detailed description and discussion better and later covered on consideration hereinafter of FIGS. 3 through 6.

Referring again to FIG. 1, it will be noted that the infeed conveyor 32 is operationally positioned with the lower receiving end thereof disposed to receive, conveyably elevate, and infeed material from a silage wagon or the like, not shown, but which would be moved into position along the side of said machine 10 and displaced therewith during the operational accomplishment of bag filling operations. Thus, the loose infeed forage material is delivered and directed into the hopper 42 by the infeed conveyor directional deflector 58 so that it is deposited to the inside forward section of said hopper 42. The loose infeed forage material to be processed by said machine 10 is simultaneously and cooperatively engaged by the vertically disposed laterally spaced tine shaft assemblies 34 and 36, and by means of the co-operative counterrotating tine sets 54 comprised of a plurality of horizontally mounted vertically spaced, incrementally angled pusher tines 56. These are assembled to form the respective counterrotating tine shaft assemblies 34 and 36 in an alternately opposing counterrotating array as shown, so to coactively engage cooperatively and compressively urge feed material directionally and controllably into and through the compression and forming chamber 40 of said machine 10 and into the delivery chamber 44 thereof for airtight compacted uniform sidewall density self-supporting storage deposit of said feed material into said bag 18.

Additional features of said machine 10 shown in FIG. 1 include the various control means of the hydraulic motor control console 38 for the multi-stage hydraulic pump 30, being pump on-off by-pass valve switches respectively 60, 62, and 64; pump flow regulators respectively 66, 68, and 70; and pump pressure gauges respectively 72, 74, and 76. The infeed conveyor hydraulic motor 78, which is regulated by control console 38 elements 60, 66, and 72 in connection thereto by hydraulic lines 80, is also shown. One other feature shown on the control console 38 is an air line fill valve 82, which provides a convenient means for adjusting pneumatically operated compression panels in the machine 10 delivery chamber 44, which will be described in detail on consideration of FIG. 3 and certain other subsequent Figures hereof. Also shown is a retractable floor assembly mounting bracket 84 being one such bracket of several by which the retractable floor 86 of the delivery chamber 44 is retained and moved from a closed to open position upon guide rails 88 when a particular bag filling operation has been completed and the machine 10 is to be cleared and cleaned in preparation for continued use employment thereof at another location. The machine 10 generally is shielded by an enclosement hood 90 which forms the delivery chamber 44 and serves also to receive and retain the detachable bag filling backstop assembly 48 for transport carriage during machine 10 transport from one use location to another. The backstop assembly 48 as shown in FIG. 1 is comprised of a backstop support frame 92 which positions and retains on the front side thereof an inverse L-shaped backstop support plate 94 the foot member 96 thereof which supports the agricultural bag end during initial filling operations to prevent tearing, and supported from the back side of said frame 92 is a set of pivotal backstop propping legs 98 which in combination with said foot member 96 cooperatively holds said backstop assembly 48 in an erect bag-end supporting position against which compression force may be retainably exerted in creating and maintaining operational conditions which produce uniform sidewall density of materials during progressive bag filling operations.

The machine 10 as disclosed in FIG. 1 preferably is contructed of steel or alloys of other metals or various plastic materials, but any other suitable materials or combinations thereof or the foregoing may be used.

Figure 3:
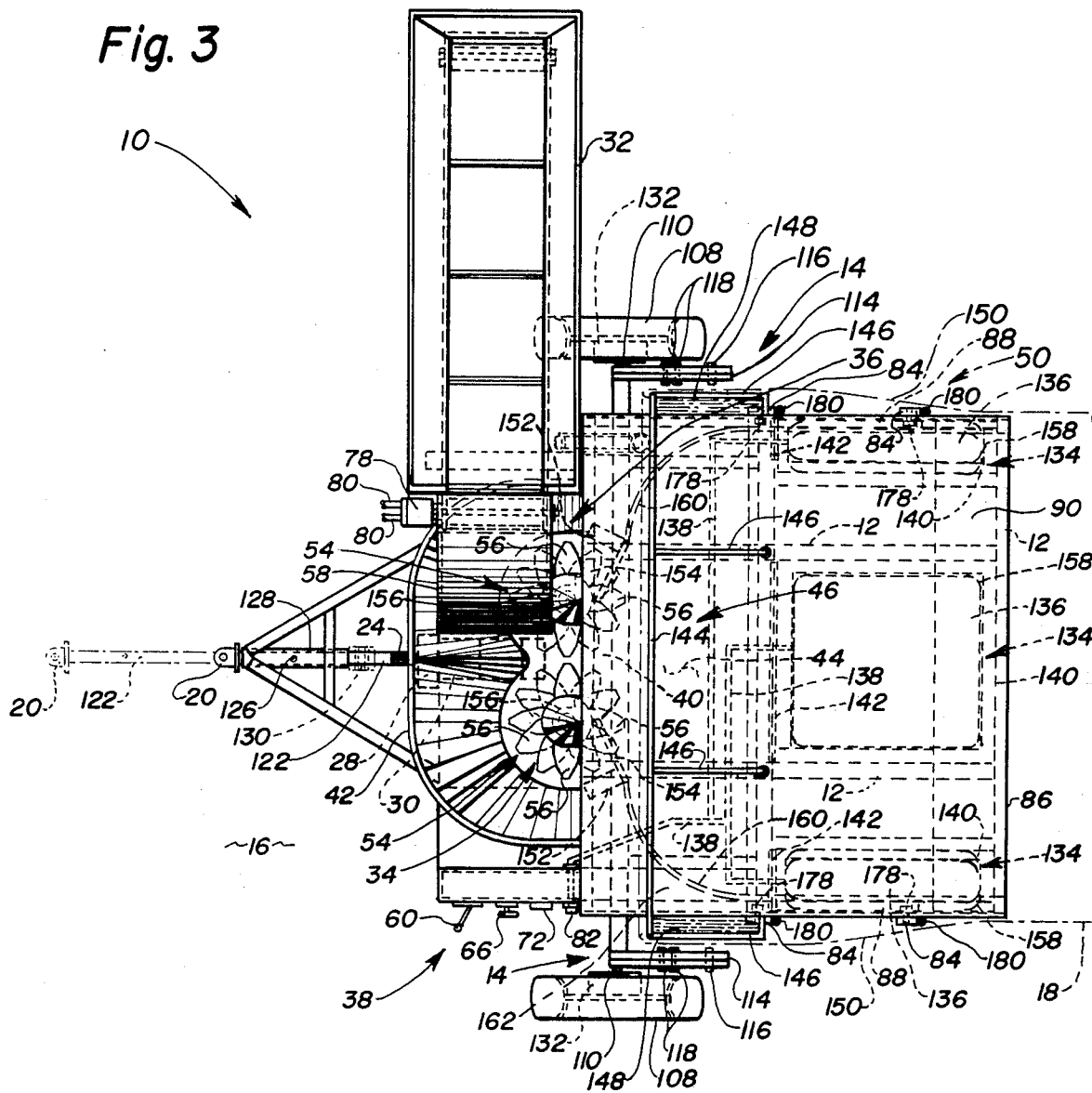
FIG. 3 is an enlarged top plan view of said machine, without illustration of the prime movement vehicle and backstop assembly.

FIG. 3 is an enlarged top plan view of the perspective illustration of machine 10 as shown in FIG. 1 wherein is shown more specifically additional structural and cooperative working features of various of the sub-assembly components as previously described generally.

Figure 10:
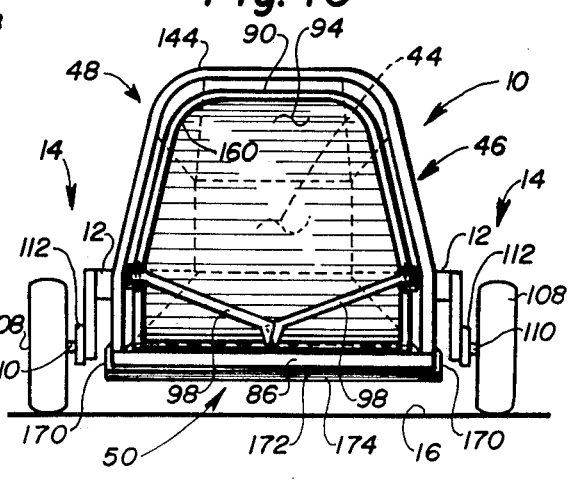
FIG. 10 is a simplified end elevation view of the machine of instant invention showing the backstop assembly therefor installed therewith in the transport carry position.
Figure 4:
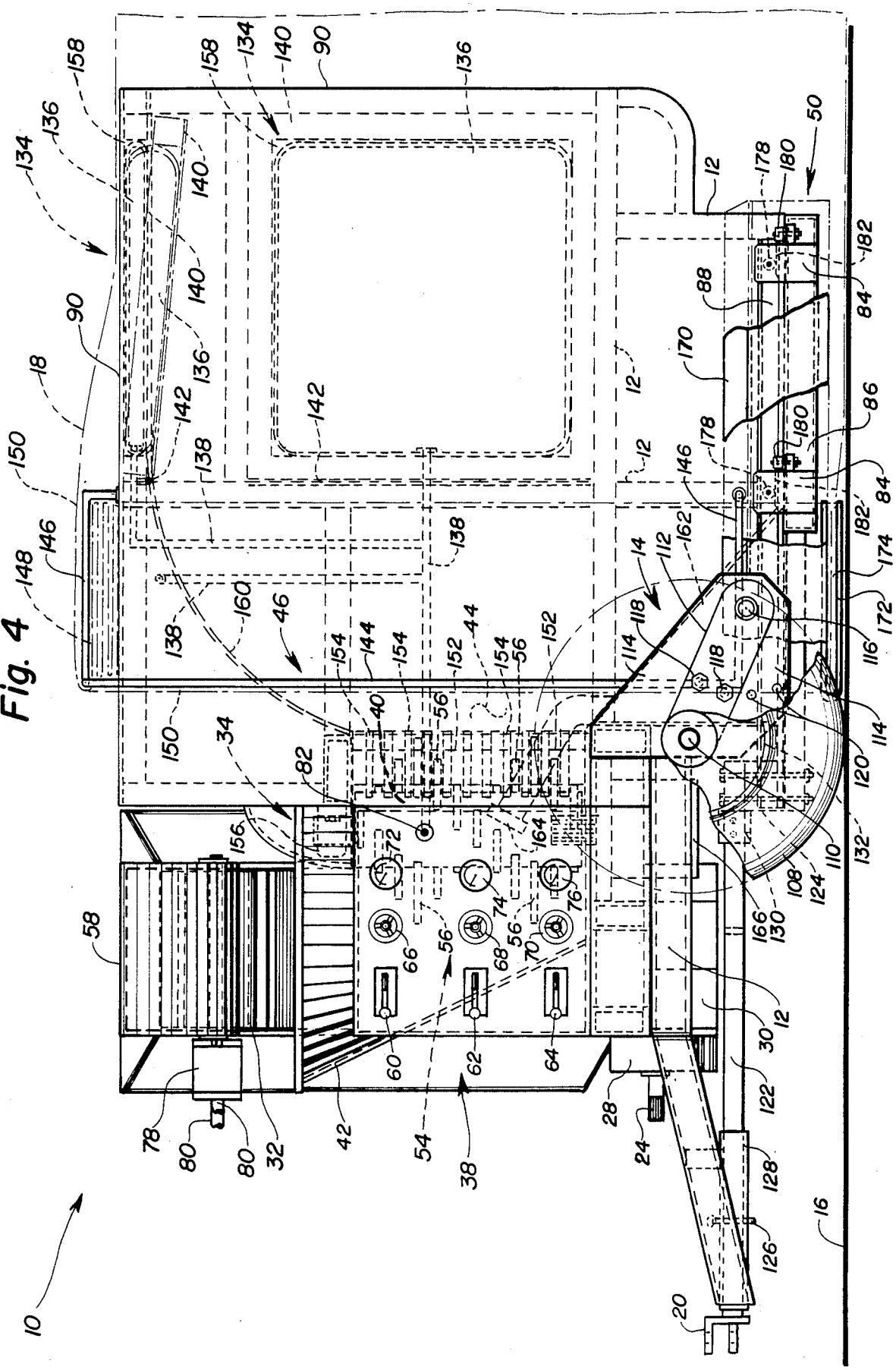
FIG. 4 is an enlarged side elevation view of said machine, without illustration of the prime movement vehicle and backstop assembly.
Figure 5:
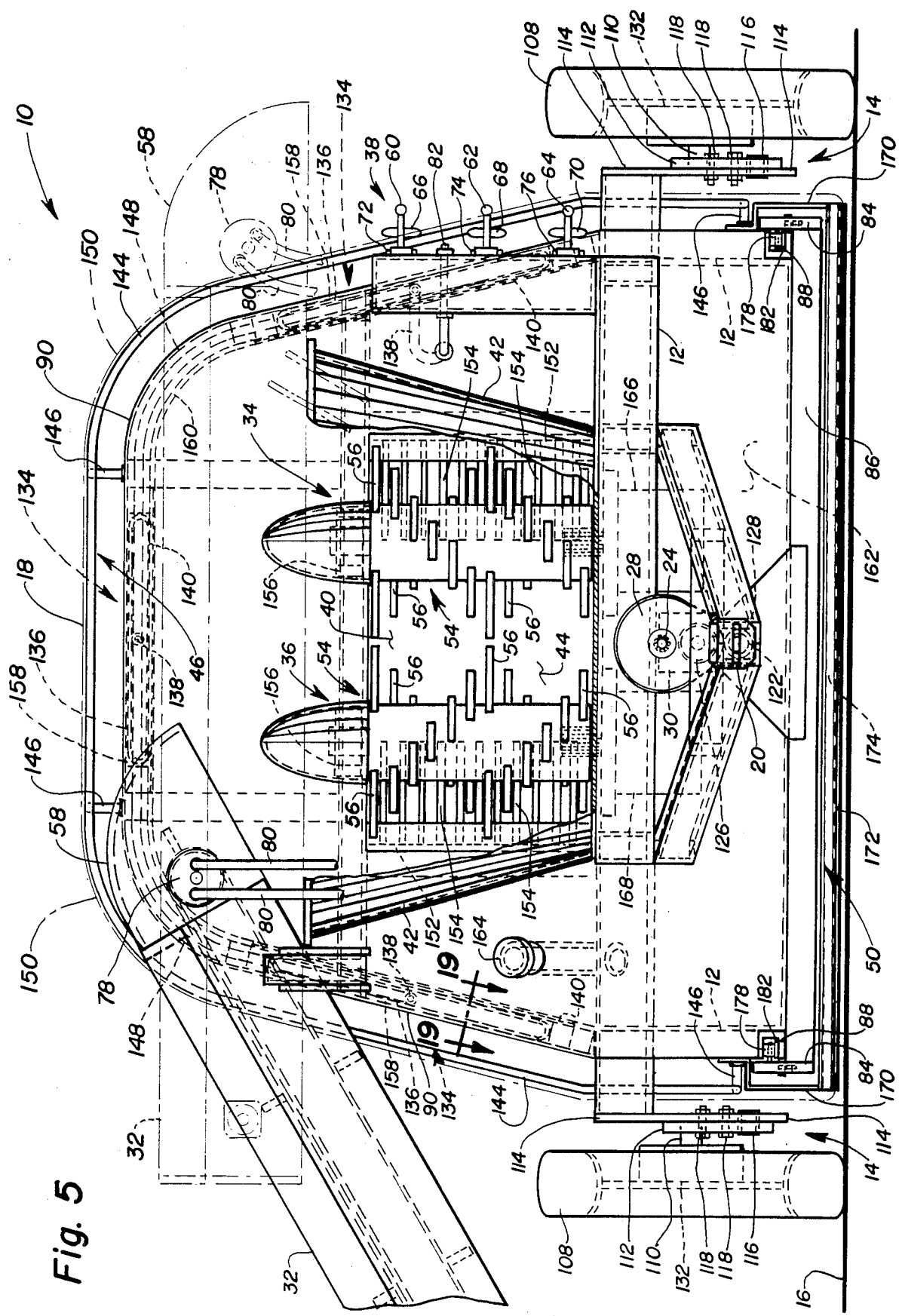
FIG. 5 is an enlarged front elevation view of said machine with the feed hopper thereof being partially cut away in order to more clearly illustrate the feed material compression and forming chamber section of said machine.
Figure 6:
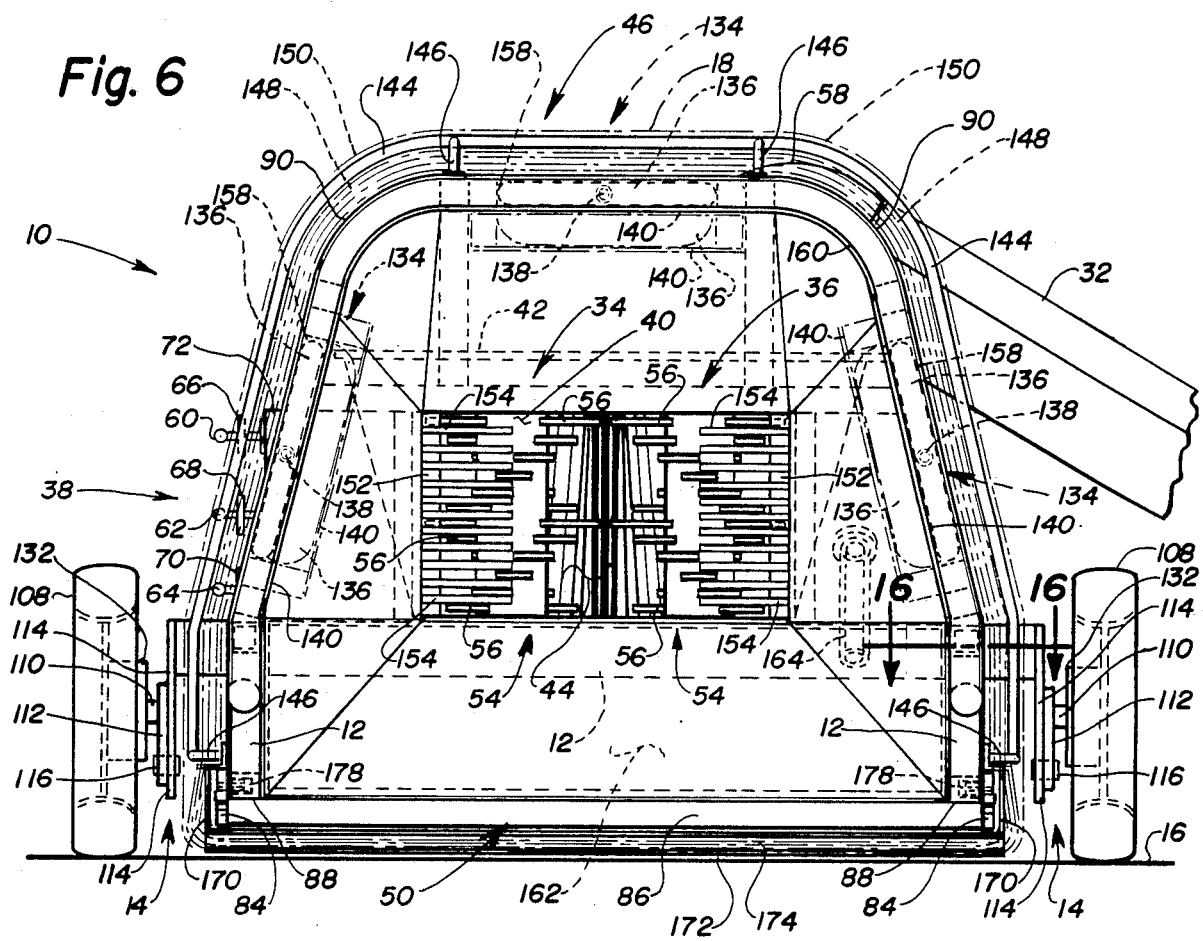
FIG. 6 is an enlarged rear elevation view of said machine showing in particular the feed material compression and forming chamber thereof in centrally intermediate spatial relationship with respect to the vertical and lateral crossection of an agricultural bag for filling.

Considering first in FIG. 3 the separately connected axle and wheel assemblies 14 whereby said undercarriage 12 is supported by a pair of spaced wheels 108 rotatably affixed upon separate axles 110 assembled to said undercarriage 12 either lateral side thereof by independently adjustable pivotally operable and set undercarriage elevation brackets 112 comprised of separate arcuate adjustment plates 114 pivotally joined respectively at one end by a pintle 116 and locked in variably set undercarriage elevation adjustment by insertion and clamping of lock bolts 118 through cooperative communicating bracket adjustment set openings 120. A clearer illustration of this assembly is shown in enlarged side elevation in FIG. 4. It should be noted that by means of said separately connected axle and wheel assemblies 14, said undercarriage 12 may be uniformly elevated to the highest set position as illustrated in FIG. 10 for over-the-road towable displacement from one use location to another. Alternatively as shown in FIGS. 4, 5, and 6 the undercarriage may be uniformily depressed to the lowest set position for operational bag loading at a use location, or as shown in FIG. 15b, it may be unevenly adjusted and set to accommodate with a greater facility either the transport or use employment of said machine 10 to the particular supporting ground surface plane 16 conditions encountered at any particular location. The relative range of undercarriage elevation adjustment and set is generally as shown in FIG. 15a.

Additional features of said machine 10 shown in greater detail in FIG. 3 include the retractable floor opening and closing means, the machine 10 braking and material density control means, and the folded agricultural bag retaining and feed control means. Considering first in greater detail the retractable floor opening and closing means, wherein it will be noted, as shown in phantom in FIG. 3, the undercarriage hitch assembly support arm 122, being connected by bracket assembly 124 to the retractable floor 86, is, upon removal of the hitch assembly support arm retaining pin 126, slidably extendable and retractable within the undercarriage mounted hitch assembly support arm sleeve 128 to move said floor 86 to either an open or closed position upon mounting brackets 84 supportably and retainably communicating within guide rails 88 assembled at either lower lateral side of said machine 10. During bag 18 filling operations the undercarriage hitch assembly support arm 122 is slidably retracted and retained by said pin 126 to maintain said floor 86 in the closed position, whereby compacted feed material is urged from the compression and forming chamber 40 and through the delivery chamber 44 supportably within said machine 10 across said floor 86 into storage deposited formation within said bag 18. However, upon completion of bag filling operations, the retaining pin 126 is removed, the hitch assembly support arm 122 slidably extended through the support arm sleeve 128 to the point of contact of the retractable floor extension stop 130 with the inner terminal edge of said support arm sleeve 128 as shown in phantom in FIG. 3, whereupon said floor 86 is thus retracted out of compacted feed material supportable position within the delivery chamber 44, and the feed material within said delivery chamber 44 is thereby deposited within the open mouth of said bag 18 and said machine 10 thus made ready for facilitated clearing and cleaning of the compression and forming chamber 40 prepatory to continued bag filling operations.

The machine 10 braking and material density control means is cooperatively comprised of the wheel brake drum assemblies 132 which are manually adjusted and set to retard machine 10 forward movement and increase deposited material compaction force between the backstop assembly 48 and the machine 10 delivery chamber 44, plus the pneumatic bladder baffle assemblies 134 comprised of pneumatic bladders 136 cooperatively adjustable by inflation or deflation through intercommunicating air lines 138 by means of the air line fill valve 82 mounted on the hydraulic motor control console 38 as previously described, which pneumatic bladders operate to increase or decrease the interdiction and thereby the delivery chamber retardation effect through adjusting set deflection of the pivot panels 140 connected by hinges 142, upon both machine 10 forward movement and compaction of material urged through said delivery chamber 44 for uniform sidewall deposit thereof into bags 18.

The folded agricultural bag retaining and feed control means is comprised of the bag feed control bar assembly 46 as previously described generally, which in turn is comprised of the bag feed control bar 144 which is positioned and held in place upon the enclosement hood 90 by the feed control bar mounting brackets 146 and disposed thereby to successively interleaf the outer bag fold 148 and the trailing bag portion 150 of the agricultural bag 18 just immediately off-fed such that as said machine 10 progressively moves forward during bag filling operations, one folded bag ply at a time is controllably off-fed successively thereby as needed and only as needed so as to prevent bag 18 fold-over, wrinkling and tearing during use employment of said machine 10.

Additional features of said machine 10 illustrated in greater detail in FIG. 3 relate to the counterrotating tine shaft assemblies 34 and 36, and in particular show the vertically disposed laterally spaced positioning thereof one with respect to the other together immediately adjacent said feed material compression and forming chamber 40. It will also be noted that each of the lateral sidewall boundary surfaces of said compression and forming chamber 40 are inward angled members 152 upon which are affixed an evenly displaced vertically spaced plurality of backfeed blocking fingers 154 between which said incrementally angled pusher tines 56 of the respective counterrotating tine sets 54 pass and which serve both to block counterrotating tine set 54 backfeed of material from the delivery chamber 44 through the compression and forming chamber 40 and into the hopper 42, and also to effect a continual screeding action over the pusher tine 56 upper and lower horizontal surfaces and thereby maintain said tine sets 54 in a clean and operable condition at all times. The upper tine shaft bearings 156, within which the tine shafts retainably rotate, are also shown in FIG. 3.

FIG. 4 shows an enlarged side elevation of said machine 10 minus the backstop assembly 48 and prime movement vehicle therefor, and illustrates in greater detail various sub-assembly components thereof, and in particular the bag feeding control bar assembly 46 as previously described and the pneumatic bladder baffle assemblies 134. Operational adjustment of said pneumatic bladder baffle assembly is shown in side elevation by the top such baffle assembly thereof located in the upper section of the delivery chamber 44. The dashed line rendition of said baffle assembly 134 illustrates the same in a fully retracted non-braking attitude, wherein it will be noted the enclosement hood 90 wall is of double-skin construction and the pneumatic bladder 136 is retainably positioned and contained within a wall pocket 158 therefor, there being three such wall pockets 158 for said bladder assemblies 134 positioned about the enclosement hood 90 of said machine 10 delivery chamber 44, all of which is better illustrated in the enlarged end elevation view shown in FIG. 5.

The phantom line rendition of said baffle assembly 134 shown in FIG. 4 illustrates the same in the pneumatic bladder 136 fully inflated and pivot panel 140 deflected braking attitude, wherein as shown, the deflected panel 140 constricts the delivery chamber interior wall profile 160 so as to increase the delivery pressure on material passing therethrough with a consequent increase in the compaction density thereof and also an increase on the restraining braking effect upon forward movement displacement of said machine 10 during the operation thereof.

Also shown in FIG. 4 is the hydraulic system reservoir 162 and the fill spout 164 therefor, plus the direct drive hydraulic motor 166 whereby counterrotating tine shaft assembly 34 is variably driven by adjustment of pump flow regulator 68 of the hydraulic motor control console 38. It should be noted there is a corresponding direct drive hydraulic motor 168, not seen in FIG. 4 but illustrated in FIG. 5, whereby opposing counterrotating tine shaft assembly 36 is variably driven by adjustment of pump flow regulator 70 of the hydraulic motor control console 38.

Lastly shown in FIG. 4, not having been previously illustrated for purposes of clarity, and here rendered in segmented view only, is the retractable floor assembly fender 170 one each of which such fenders are mounted on either lower lateral side of said machine 10 and serve to protect the off-fed trailing bag portion 150 from catching on and being torn by the retractable floor assembly 50, and further serve to support affixment of the bag shield 172 which holds the undercarriage span of folded bag material 174 and protects the same from either puncture or tearing by ground surface plane obstructions during use employment displacement of said machine 10.

The enlarged front elevation view as shown in FIG. 5 illustrates the operational configuration deployment of the infeed conveyor 32, and in phantom the retracted transport carry position thereof as the same would be disposed during relocation movement of said machine 10 from one use location to another.

Also shown in FIG. 5 with greater clarity is the relative spatial relationship laterally of the respective counterrotating tine shaft assemblies 34 and 36 as well as the respective co-operative counterrotating tine sets 54 thereof with their sequential opposing array of incrementally angled pusher tines 56 and the same in turn with sequential passage relationship to the backfeed blocking fingers 154, all of which cooperatively operate to urge feed material from the hopper 42 through the feed material compression and forming chamber 40 through the delivery chamber 44 and into uniform sidewall density airtight compacted deposit sequentially within the agricultural bag 18.

It should be mentioned at this point that the counterrotating tine shaft assemblies 34 and 36 are operated at high torque and relatively low rotational speeds, on the order of twenty to forty revolutions per minute. It should also be noted, however, that the specific operational speed of counterrotation of said assemblies 34 and 36 depends upon the processing characteristics of the particular feed material substance being processed, and although the adjusted counterrotation speeds will normally be equal, they may at times be adjusted by means of the control console 38 pump flow regulators 68 and 70 to be other than equal. Also, as will be explained in greater detail on consideratin of FIGS. 13 and 14, the counterrotating tine shaft assembly 34 and 36 co-operative counterrotating tine sets 54 simultaneously impart a sequential forward and elevating force effect on feed material mass during the urging thereof through the feed material compression and forming chamber 40.

The enlarged end elevation view shown in FIG. 6 illustrates the delivery chamber 44 side of said machine 10, and particularly shows the centrally intermediate spatial relationship of the elevation and lateral disposition of the feed material compression and forming chamber 40 with respect to the agricultural bag 18.

Figure 7:
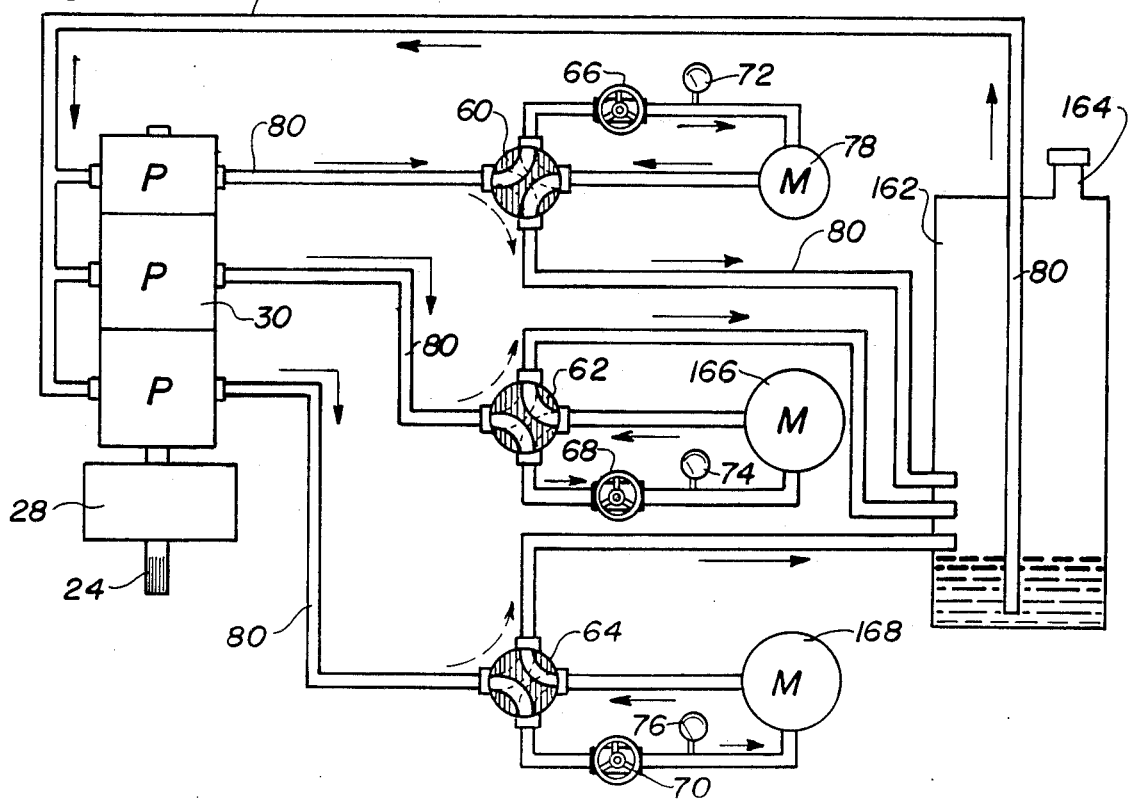
FIG. 7 is a schematic flow and control diagram of the machine hydraulic system.

The machine 10 hydraulic system schematic diagram shown in FIG. 7 illustates generally the power take-off, flow, and control of the hydraulic pump and motor components, as has been previously described in detail, which drive the infeed conveyor 32 and counterrotating tine shaft assemblies 34 and 36.

Figure 8:
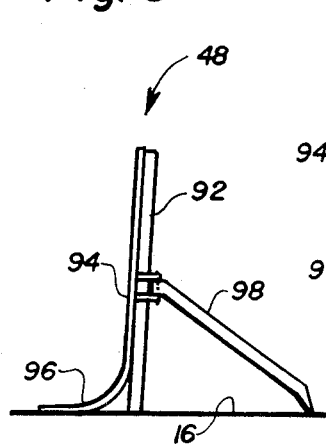
FIG. 8 is a simplified side elevation view of the backstop assembly.
Figure 9:
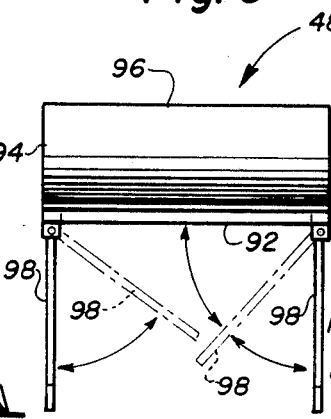
FIG. 9 is a simplified top plan view of the backstop assembly.

The various views shown in FIGS. 8, 9, and 10 illustrate greater detail of structure and use of the detachable bag filling backstop assembly 48 as has been previously described in detail. FIG. 10 illustrates the insertable assemblage thereof within the machine 10 delivery chamber 44 enclosement hood 90 for effecting the placement transport thereof from one use location to another.

The fragmentary enlarged top plan view shown in FIG. 11 is that of the preferred embodiment version of the counterrotating shaft assemblies 34 and 36 of the machine 10 of instant invention, being a cooperative pair of such counterrotating shaft assemblies, and further illustrates with greater specific clarity the incrementally angled pusher tines 56 respectively having increasingly incrementally angled pusher tine faces 56a, 56b, and 56c preferably 30, 45, and 60 degrees, although other such angular combinations are possible such as 15, 30, and 45 degrees or the like, whereby said faces 56a, 56b, and 56c operate on cooperative counterrotation to impart sequential forces in unidirectionally compacting and urging feed material from the hopper 42 and into and through the feed material forming and compression chamber 40.

The fragmentary enlarged top plan view shown in FIG. 12 is that of an alternate embodiment version of the counterrotating shaft assemblies 34 and 36 of the machine 10 of instant invention, being a cooperative plurality of such counterrotating shaft assemblies wherein the respective pairs thereof disposed other than adjacent the inward angled members 152 are provided with a set of backfeed blocking fingers 154 mounted upon an intermediate vertically disposed angled member 176.

The views shown in FIGS. 13 and 14 are diagrammatic force profiles of the sequential horizontal and vertical moments of movement imparted by the co-operative counterrotating tine sets 54 upon feed material. It will be noted in FIG. 13 that as opposing incrementally angled pusher tines 56 of the counterrotating tine shaft assemblies 34 and 36 counterrotationally displace in closing arcs that the pushing force effect respectively and cooperatively thereof represented by force vector arrows off the leading face trace of said incrementally angled pusher tines 56 for the incrementally angled pusher tine faces 56a, 56b, and 56c sequentially change in the horizontal plane through arcuate displacement closing and beyond whereby proportional distribution urging of feed material through the compression and forming chamber 40 is accomplished and uniform sidewall density deposit thereof from the delivery chamber 44 into an agricultural bag 18 is controlled.

The vertical force vector profile imparted simultaneously to the feed material by said co-operative counterrotating tine sets 54 is shown in FIG. 14 in diagrammatic vector arrow rendition and is consequent from the spiral disposition of said incrementally angled pusher tines and the structural tendency thereof upon cooperative counterrotation to lift and elevate the feed material while at the same time urging it forward as earlier described.

The simplified machine 10 views shown in FIG. 15a and FIG. 15b illustrate, as earlier described, respectively (a) the uniform undercarriage 12 elevation and lowering by use and adjustment of the separately connected axle and wheel assemblies 14, and (b) uneven adjustment thereof to more satisfactorily accommodate the use employment of said machine 10 to supporting ground surface plane 16 profiles which are other than even.

The enlarged top plan sectional view shown in FIG. 16 illustrates with greater detail and clarity as previously described the separately connected axle and wheel assembly 14 and vertical adjustment and set means therefor, the bag feed control bar assembly 46 and outer bag fold 148 single ply off-feed thereof, and the delivery chamber retractable floor assembly mounting brackets 84 and in particular the horizontal guide rail follower roller 178 and vertical guide rail stabilizer roller 180 therefor which cooperatively with corresponding guide rail follower and stabilizer rollers machine lateral therefrom mechanically accommodate opening and closing of said delivery chamber retractable floor assembly 50.

The enlarged segmented side elevation view shown in FIG. 17 illustrates in greater detail the delivery chamber retractable floor assembly 50 and the various component and cooperative parts operative therewith as previously described, and further shows the cam plate 182 floor elevating and friction locking mechanism whereby said retractable floor 86 is maintained in a stable position within the delivery chamber 44 when closed. It will be noted in the solid line rendition of said retractable floor assembly 50 as shown in FIG. 17 in closed position the respective horizontal guide rail follower rollers 178 are elevated upon the cam plates 182 respectively provided therefor upon the guide rail 88 and the upper floor horizontal surface is cammed upward in a friction lock against the lower guide rail surface. In the phantom rendition of said retractable floor assembly 50 as shown in FIG. 17 in partial open position the respective horizontal guide rail follower rollers 178 have been moved forward off said cam plates 182 thereby lowering the retractable floor 86 out of the friction lock position. The view shown in FIG. 18 is an end elevation crossection of the assembly just described with the retractable floor 86 cammed up into the friction lock position.

Lastly, the view shown in FIG. 19 is an enlarged side elevation of a mechanical alternative for adjustably setting pivot panel 140 braking deflection within the machine 10 delivery chamber 44, and is simply comprised of a threaded shaft 184 operable through a fixed nut 185 upon an inclined wedge 186 assembled at one end thereof which operates on extension or retraction as shown in phantom against and between an inclined panel back 188 and the enclosement hood 90 surface to deflect said pivot panel 140 outward or inward about hinge 142 against or with return spring 190 pressure.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

We claim:

1. Apparatus for compactly loading a chopped vegetable animal feed into a flexible, elongated agricultural feed bag comprising:
   a feed material compression and forming chamber;
   a pair of cooperating vertically extending counterrotating tine shaft assemblies positioned adjacent said feed material compression and forming chamber;
   a hopper for receiving feed and placing the feed against said tine shaft assemblies;

an infeed conveyor positioned adjacent the hopper for conveying feed to the hopper; and an open ended delivery chamber positioned on the opposite side of said feed material compression and forming chamber from said counterrotating tine shaft assemblies for receiving feed material from said compression and forming chamber, said delivery chamber including:

an enclosement hood; and a retractable floor assembly; and means mounted on said enclosement hood for retaining a folded, flexible agricultural feed bag in a position in which a portion of said bag surrounds a part of said delivery chamber, and for dispensing said bag from the folds thereof away from said delivery chamber as feed enters said bag from the open end of said delivery chamber.

2. Apparatus as defined in claim 1 wherein said retractable floor assembly comprises:

a horizontally movable floor;

horizontally extending guide rails mounted on said delivery chamber at the lower side thereof;

means rollably supporting said floor on said guide rails; and a hitch assembly support arm connected to said movable floor and projecting forwardly of said hopper and said feed material compression and forming chamber.

3. Apparatus as defined in claim 2 wherein said means rollably supporting said floor on said guide rails comprises:

a plurality of spaced brackets;

a pair of rollers carried on each of said brackets and including a horizontally extending roller and a vertically extending roller, said rollers each rollably bearing against one of said horizontally extending guide rails; and a cam plate carried on each of said guide rails adjacent one end of each of said rails for cooperating with said horizontally extending rollers to cam said moveable floor upwardly to a closing position as said moveable floor is moved horizontally toward said closing position.

4. Apparatus as defined in claim 2 wherein said means mounted on said enclosement hood for retaining a folded bag in a position in which a portion of said bag surrounds a part of said delivery chamber, and for dispensing said bag comprises:

a bag feed control bar positioned spaced outwardly from said enclosement hood; and a plurality of horizontally spaced bar mounting brackets supporting said control bar upon said hood in said spaced relationship to said hood, said bar mounting brackets each having an L-shaped configuration which includes:

a first leg secured to said control bar and spaced outwardly from said hood to define a space for receiving said bag folds; and a second leg extending normal to said first leg and having one end secured to said hood, and the second end secured to one end of said first leg, said control bar being positioned forwardly, in the direction of movement of the machine, from the points of attachment of said second legs to said hood.

5. Apparatus as defined in claim 2 wherein each of said tine shaft assemblies comprises:

a vertically extending, rotatably supported shaft; and a plurality of radially extending tines supported on said shaft with said tines arranged in a helical array therearound, each of said tines having at least three incrementally angled, contiguous pusher faces extending at acute angles to each other along one edge of the respective tine, whereby the angled pusher faces cooperate upon counterrotation of the shafts upon which they are carried in the pair of counterrotating tine shaft assemblies, to thereby unidirectionally compact and urge feed material from the hopper and into and through the feed material forming and compression chamber.

6. Apparatus for loading chopped, compacted material into an elongated flexible bag comprising:

a movably mounted undercarriage;

a hopper supported on said undercarriage for receiving the material;

a pair of vertically extending, rotatably driven, counterrotating tine shaft assemblies mounted on said undercarriage adjacent said hopper for receiving material to be chopped from the hopper and chopping material;

an open ended delivery chamber including opposed walls and mounted on said undercarriage and positioned on the opposite side of said shaft assemblies from said hopper for receiving chopped material from said two shaft assemblies;

a plurality of adjustable pivot panels mounted in said delivery chamber adjacent a plurality of the walls of said delivery chamber for interdicting progressive transit of chopped material through the delivery chamber and concurrently compacting the chopped material; and means mounted on said delivery chamber for retaining a folded bag in a position in which a portion of said bag surrounds a part of said delivery chamber, and for dispensing said bag from the folds thereof away from said delivery chamber as feed enters said bag from the open end of said delivery chamber.

7. An agricultural bag loading machine adapted to continuously compress and progresssively feed chopped vegetable feed material into agricultural bags for uniform density feed material in-field storage, said machine comprising in combination:

a mobile undercarriage including interconnected horizontal and vertical members;

a feed material compression and forming chamber mounted on said mobile undercarriage;

a material feed hopper in said compression and forming chamber;

an open ended delivery chamber mounted on said undercarriage and adapted to receive chopped material and deliver it through an open end thereof to an elongated flexible agricultural bag carried thereby;

a plurality of vertically disposed, laterally spaced shafts rotatably supported on said undercarriage adjacent said feed material compression and forming chamber;

a plurality of horizontally mounted, vertically spaced tines assembled in an alternating opposing array along each of said vertically disposed shafts adjacent said feed material compression and forming chamber and adapted to coactively engage and compressably urge feed material from said hopper into said feed material compression and forming chamber and therefrom through said delivery chamber when said plurality of shafts are counterrotated, each of said tines being provided with an incrementally angled pusher face leading profile comprised of three distinct, progressively receding angular segments;

means mounted on said delivery chamber for retaining a folded bag in a position in which a portion of said bag surrounds a part of said delivery chamber, and for dispensing said bag from the folds thereof away from said delivery chamber as feed enters said bag from the open end of said delivery chamber; and a backstop to retainably engage the filled end of the bag as compressed and formed feed material is progressively delivered thereto from said delivery chamber, whereby the mobile undercarriage of said machine is removably displaced therefrom during progressive bag filling.

8. The method of progressively feeding a chopped, compressed vegetable animal feed material into a flexible, elongated, generally cylindrical agricultural feed bag for subsequent use in in-field animal feeding comprising:

placing a plurality of radially superimposed accordian pleat folds in radial alignment with the open mouth of the bag;

forming a feed material delivery chamber so that the chamber has a trapezoidal cross-sectional configuration in a plane extending normal to the direction of movement of chopped compressed feed material therethrough, with the relatively longer parallel side of the trapezoid forming the lower side of the chamber, and the relatively shorter parallel side of the trapezoid forming the upper side of the chamber, and so as to have a pair of horizontally spaced openings on opposite sides of said plane;

sleeving said bag around the outer side of said chamber so that said folds are located adjacent one of said openings, and concurrently distending the closed end of said bag into a trapezoidal configuration substantially conforming to the cross-sectional configuration of said delivery chamber and at a location spaced horizontally from said delivery chamber and the other of said delivery chamber openings;

continuously feeding chopped compressed animal feed material in a formed shape of rectangular transverse cross-sectional configuration through said one opening at a location within said delivery chamber in which the rectangular cross-sectioned feed material is located nearer to the relatively shorter upper parallel side of the trapezoid of the chambers trapezoidal crosssection than to the relatively longer lower parallel side of the trapezoid; and continuously controllably braking the relative movement of the distended closed end of said bag horizontally away from said chamber during said continuous feeding, and while paying the bag out from said accordian pleat folds.

9. An agricultural bag loading machine adapted to continuously compress and progressively feed chopped animal vegetable feed material into flexible agricultural bags in a formed mass of substantially uniform density for storage in the field in the bag, said machine comprising in combination:

a wheeled vehicular undercarriage having interconnected horizontal and vertical members;

a feed material compression and forming chamber supported on said undercarriage and interconnected to an infeed hopper at one end thereof and having a hood defining a delivery chamber at the other end thereof;

a pleat folded bag retaining and dispensing means mounted on said hood and adapted to supportably receive and retain accordian pleats formed adjacent the open end of a flexible agricultural bag when the bag is disposed around the hood for receiving compressed chopped animal vegetable feed material from said delivery chamber;

horizontally and laterally spaced, vertically disposed shafts assembled upon said interconnected horizontal and vertical members of said undercarriage adjacent said feed material compression and forming chamber;

bearing means assembled upon said interconnected horizontal and vertical members, and rotatably supporting said laterally spaced shafts;

drive means supported upon said vehicular undercarriage for driving said vertically disposed, laterally spaced shafts in counterrotation relative to each other;

a plurality of horizontally projecting, vertically spaced tines assembled along the length of each of said vertically disposed, laterally spaced shafts and positioned adjacent said feed material compression and forming chamber, the tines on said shafts being adapted by their positions to cooperate in compressively acting upon said feed material and in urging said feed material from said infeed hopper into said feed material compression and forming chamber, and from said feed material compression and forming chamber through said delivery chamber so as to develop a uniform side wall density in the feed material fed into said bag by the counterrotation of said plurality of vertically disposed, laterally spaced shafts, each of said tines having at least three incrementally angled pusher faces extended at acute angles to each other, with each said pusher face, as viewed from the respective tine tip radially inwardly toward the axis of the shaft upon which it is carried, extending at progressively lesser angles to a projected diameter of the respective shaft upon which the respective tine is mounted, whereby the angled pusher faces on the two counterrotating shafts cooperate upon such counterrotation of the shafts to thereby unidirectionally compact and urge feed material from the hopper into and through the feed material forming and compression chambers;

a displaceable static backstop means for retainably engaging the filled end of a flexible agricultural bag as compressed and formed feed material is progressively delivered into the open end of the bag, whereby the wheeled vehicular undercarriage of said machine is movably displaced away from said static backstop means as the bag becomes progressively filled; and brake shoe means adapted to be adjustably set to selectively control displacement of said undercarriage during bag filling operations whereby feed material is progressively compressed and progressively formed within said bag.

10. An agricultural bag loading machine adapted to continuously compress and progressively feed chopped animal vegetable feed material into flexible agricultural bags in a formed mass of substantially uniform density for storage in the field in the bag, said machine comprising, in combination:
- a wheeled vehicular undercarriage having interconnected horizontal and vertical members;
- a feed material compression and forming chamber supported on said undercarriage and interconnected to an infeed hopper at one end thereof and having a hood defining a delivery chamber at the other end thereof;
- a folded bag retaining and dispensing means mounted on said hood and adapted to supportably receive and retain accordian pleats formed adjacent the open end of a flexible agricultural bag when the bag is disposed around the hood for receiving compressed chopped animal vegetable feed material from said delivery chamber, said folded bag retaining and dispensing means comprising:
- a bag feed control bar positioned around and held in place at an outwardly spaced location with respect to said hood; and
- a plurality of spaced bar mounting brackets positioning and holding said bag feed control bar in its outwardly spaced position relative to said hood, said bar mounting brackets each having an L-shaped configuration and including:
- a first leg secured to said bag feed control bar, and spaced outwardly from said hood to define a space between the respective first leg and the hood for receiving the folds of a flexible agricultural bag as said folds are inserted in said space; and
- a second leg extending normal to said first leg and having one end secured to said hood and the other end secured to said first leg, said control bar being positioned forwardly in the direction of movement of said machine from, and with respect to, the points of attachment of said second legs to said hood, and said control bar defining with said hood an opening into said spaces between said first legs and said hood;
- said mounting brackets being adapted to successively interleaf a plurality of accordian pleated bag folds adjacent the mouth of the bag, and effect the dispensing of the bag from said accordian pleated folds during progressive bag filling operations;
- horizontally and laterally spaced, vertically disposed shafts assembled upon said interconnected horizontal and vertical members of said undercarriage adjacent said feed material compression and forming chamber;
- bearing means assembled upon said interconnected horizontal and vertical members, and rotatably supporting said laterally spaced shafts;
- drive means supported upon said vehicular undercarriage for driving said vertically disposed, laterally spaced shafts in counterrotation relative to each other;
- a plurality of horizontally projecting, vertically spaced tines assembled along the length of each of said vertically disposed, laterally spaced shafts and positioned adjacent said feed material compression and forming chamber, the tines on said shafts being adapted by their positions to cooperate in compressively acting upon said feed material and in urging said feed material from said infeed hopper into said feed material compression and forming chamber, and from said feed material compression and forming chamber through said delivery chamber so as to develop a uniform side wall density in the feed material fed into said bag by the counterrotation of said plurality of vertically disposed, laterally spaced shafts;
- a displaceable static backstop means for retainably engaging the filled end of a flexible agricultural bag as compressed and formed feed material is progressively delivered into the open end of the bag, whereby the wheeled vehicular undercarriage of said machine is moveably displaced away from said static backstop means as the bag becomes progressively filled; and
- brake shoe means adapted to be adjustably set to selectively control displacement of said undercarriage during bag filling operations whereby feed material is progressively compressed and progressively formed within said bag.

* * * * *